United States Patent
Staney

(10) Patent No.: US 6,526,667 B1
(45) Date of Patent: Mar. 4, 2003

(54) SATELLITE SPACECRAFT TARGETING DEVICE AND METHOD

(76) Inventor: Wayne Staney, 2208 E. University Ave., Urbana, IL (US) 61802

( * ) Notice: Subject to any disclaimer, the term of this patent is extended or adjusted under 35 U.S.C. 154(b) by 0 days.

(21) Appl. No.: 09/615,928

(22) Filed: Jul. 13, 2000

(51) Int. Cl.⁷ ................................................. G01C 1/00
(52) U.S. Cl. ............................................ 33/268; 33/273
(58) Field of Search ................................. 33/268, 1 CC, 33/272, 273, 281, 286, 333, 347, 351, 353, 354, 370

(56) References Cited

U.S. PATENT DOCUMENTS

| | | | | |
|---|---|---|---|---|
| 4,138,826 A | * | 2/1979 | Inge | 33/281 |
| 4,236,313 A | * | 12/1980 | Griffin, Jr. | 33/268 |
| 4,454,658 A | * | 6/1984 | Lewis et al. | 33/268 |
| 5,274,926 A | * | 1/1994 | Dillon | 33/268 |
| 5,276,972 A | * | 1/1994 | Staney | 33/268 |

* cited by examiner

Primary Examiner—Christopher W. Fulton
(74) Attorney, Agent, or Firm—McHale & Slavin

(57) ABSTRACT

A device for determining the suitability of a communications satellite antenna reception device site has a bubble level and inclinometer for orienting the device vertically and horizontally. The device also carries a magnetic compass and an azimuth dial for establishing orientation relative to magnetic North and True North. The device also carries a declination slider and an inclinometer for establishing celestial declination of a satellite spacecraft. A viewing lens is used to observe obstructions, or the lack thereof, along the line of site between the antenna reception device and the satellite spacecraft.

4 Claims, 5 Drawing Sheets

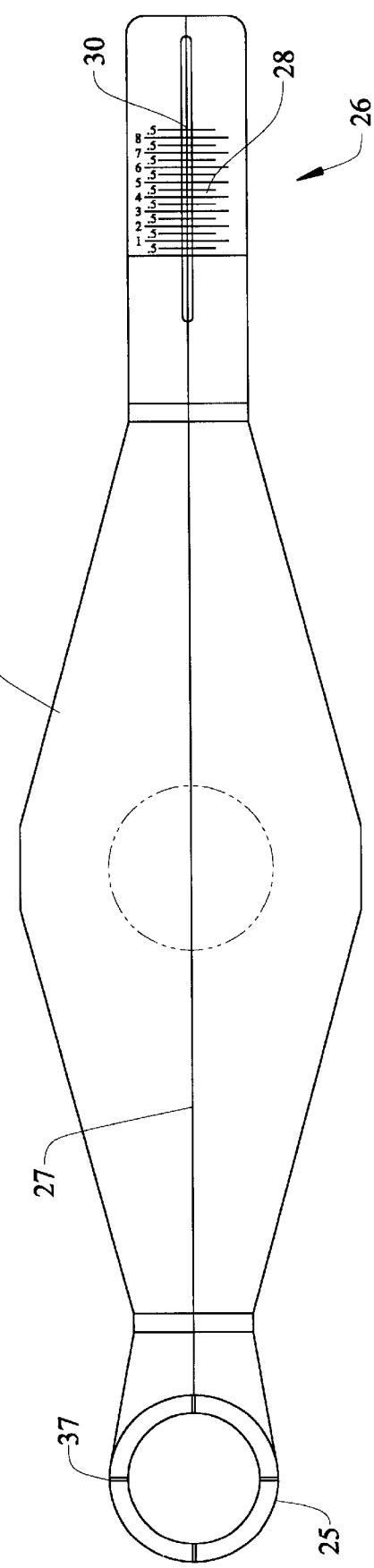
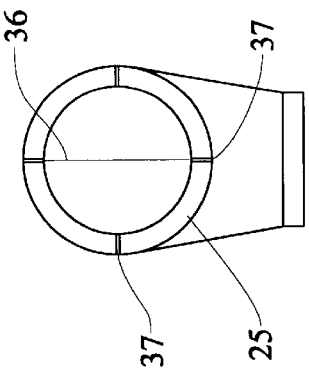
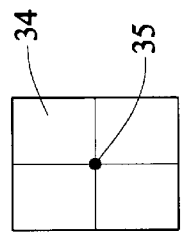
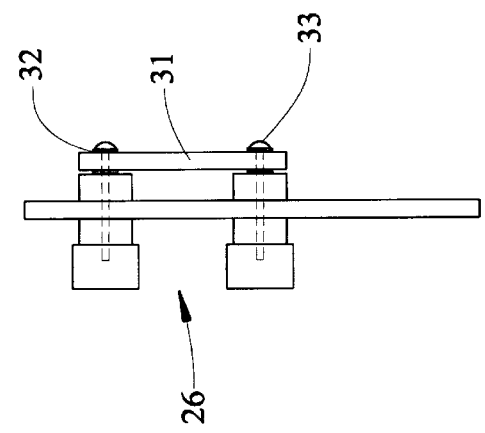

FIG. 9

| LATITUDE | DECLINATION | LATITUDE | DECLINATION |
|---|---|---|---|
| 1 | 0.15 | 42 | 5.78 |
| 2 | 0.31 | 43 | 5.89 |
| 3 | 0.45 | 44 | 6 |
| 4 | 0.61 | 45 | 6.11 |
| 5 | 0.76 | 46 | 6.22 |
| 6 | .09 | 47 | 6.32 |
| 7 | 1.06 | 48 | 6.42 |
| 8 | 1.21 | 49 | 6.52 |
| 9 | 1.37 | 50 | 6.61 |
| 10 | 1.51 | 51 | 6.7 |
| 11 | 1.66 | 52 | 6.8 |
| 12 | 1.8 | 53 | 6.89 |
| 13 | 1.95 | 54 | 7.02 |
| 14 | 2.1 | 55 | 7.06 |
| 15 | 2.25 | 56 | 7.14 |
| 16 | 2.39 | 57 | 7.22 |
| 17 | 2.54 | 58 | 7.3 |
| 18 | 2.68 | 59 | 7.38 |
| 19 | 2.82 | 60 | 7.46 |
| 20 | 2.97 | 61 | 7.53 |
| 21 | 3.11 | 62 | 7.6 |
| 22 | 3.25 | 63 | 7.67 |
| 23 | 3.38 | 64 | 7.74 |
| 24 | 3.53 | 65 | 7.8 |
| 25 | 3.66 | 66 | 7.86 |
| 26 | 3.8 | 67 | 7.92 |
| 27 | 3.94 | 68 | 7.98 |
| 28 | 4.07 | 69 | 8.03 |
| 29 | 4.2 | 70 | 8.09 |
| 30 | 4.33 | 71 | 8.14 |
| 31 | 4.47 | 72 | 8.18 |
| 32 | 4.59 | 73 | 8.23 |
| 33 | 4.71 | 74 | 8.27 |
| 34 | 4.85 | 75 | 8.31 |
| 35 | 4.97 | 76 | 8.34 |
| 36 | 5.09 | 77 | 8.38 |
| 37 | 5.21 | 78 | 8.41 |
| 38 | 5.33 | 79 | 8.43 |
| 39 | 5.45 | 80 | 8.47 |
| 40 | 5.56 | 81 | 8.49 |
| 41 | 5.67 | | |

SATELLITE SPACECRAFT TARGETING DEVICE AND METHOD

FIELD OF THE INVENTION

The invention relates to the field of satellite spacecraft communications and, specifically, to a method and device for determining a suitable location and orientation of an antenna reception device.

BACKGROUND OF THE INVENTION

Satellite TV has become a conventional system for bringing a high quality TV signal to the consumer anywhere in the world. The newer, smaller, and less obtrusive antenna reception devices have overcome much of the consumer resistence and have greatly increased the demand for satellite TV. Unfortunately, the major requirement for the best results in satellite systems is sometimes lost or not sufficiently emphasized to the buying public.

Communications with satellite spacecraft require the ground based antenna reception device to have a clear line of sight with the satellite spacecraft. Any obstruction in the path of the signal will degrade the reception. To fulfill this requirement, it is necessary for the satellite spacecraft to be located at a particular position, in space, from the antenna reception device site. Because of the distance between the communications satellite spacecraft and the earth, the angular adjustments of the antenna reception device to tune the signal are minute. Therefore, the antenna reception device must be located rather precisely.

Before installing an antenna reception device, the site should be surveyed to determine the suitability of the location. As part of the survey, the position of the satellite spacecraft relative to the site must be established. The instrument and method of this invention may be used to target the satellite spacecraft thereby producing a line of sight between the satellite spacecraft and the instrument. Simply by looking through the instrument, the presence or absence of obstructions between the antenna reception device site and the satellite spacecraft may be observed.

DESCRIPTION OF THE PRIOR ART

Presently, most of the satellite spacecraft receivers have a tuning meter built within the unit as an aid to installation of the antenna reception device. The tuning meter merely indicates the presence of an acceptable signal without directional guidance. Further, the TV and the antenna reception device system have to be hooked up to operate the tuning meter. This means that if there is no acceptable signal in a preselected location, the antenna reception device and whatever securing means necessary for fixing it in place has to be disassembled and reassembled in another location. The tedious search for the satellite spacecraft then begins again with minute movements of the TV antenna reception device monitored by the tuning meter.

SUMMARY OF THE INVENTION

This invention arrives from the need for a device in the satellite communications field that will accurately locate a satellite spacecraft's position in outer space with respect to the proposed antenna reception device's site location. The consumer is also in need of a device that will allow the consumer the ability to perform this location task independently without the assistance of an installer. Since the explosion of the satellite communications field in the late 1980's and 90's, the tremendous increase of installations and the user friendliness of electronics has left one area of this field stagnant. This area is the area of site location.

Since satellite spacecraft reception requires a line of site free from obstructions, many locations have proven to be non obstacle free and from that less than adequate reception has been realized. The antenna receiver electronics of today have a turning meter built within the unit to locate the spacecraft signal but the complete unit must be installed completely before this process of turning can be started. All too many times the installer realizes that a location is inadequate for reception and the antenna reception device must be disassembled and relocated elsewhere. This trial and error method has proved so costly to the installer that a continuous turnover of competent installers has been experienced in this particular field along with dissatisfaction in the consumer market of satellite communications reliability.

This invention, which has global accuracy, fills this void by the novel inventions incorporated within it. This invention will allow consumers and professionals to achieve accurate antenna reception device locations, adequate installations, and to realize the value and potential of received signals globally without the extra costs and time now needed to perform these tasks. This invention eliminates this inefficiency and allows the consumer, globally, to install an antenna reception device by following the layman friendly procedures incorporated in this invention.

This invention can also be used as a teaching aid in schools for scientific and cultural advancements and awareness of the boundless applications that this field can deliver. The novelties of this invention views the satellite spacecraft's true position in relationship to the antenna reception device's proposed site before installation has taken place, thereby ruling out inadequate locations. Since inferior locations can reduce an antenna reception device's gain, thereby reducing the signal amount and even loss of the entire reception, this invention proves valuable to the professional, the instructor and consumer alike. Once positioned, the invention can be moved to other locations within the same latitude requiring only the leveling of the invention again.

This invention goes steps further by achieving the satellite spacecraft's position, locating the antenna reception device's ground position, and ruling out sites that do not achieve these objectives. This is achieved by a novel set of steps and alignment coordinates that reduce the error of site location and satellite spacecraft position along with precise laser manufacturing techniques. The remaining novelty is the invention's simplicity to be used world wide and by everyone without in-depth knowledge of the satellite communications field.

Some of the novelties incorporated within this invention include a declination slider which changes the field of view within the viewing lens yielding a precise position of the satellite spacecraft within the Clark belt orbit and normally overlooked by the standard azimuth, elevation method. This measurement is critical when targeting a spacecraft for reception from the Clark belt. The second novelty is the procedure for shifting the coordinates from magnetic north and south to true north and south coordinates. This is achieved by an azimuth dial that first corrects the error from a compass dial to that of true headings and then allows the pointer a place of origin from which to base the azimuth headings for the intended targeting of that particular spacecraft of interest. This procedure eliminates errors caused by unnecessary m movements that could induce error in the calculations. The third novelty are friction reducing surfaces such as Teflon and nylon which allows easy alignment of each coordinate and dual color graphics on the graduations scale for concise alignment of each coordinate.

Once these tasks are completed the entire device is tilted to the perspective site's latitude and completes the alignment yielding the exact spacecraft's position and any obstacles or obstructions that may interfere with the antenna reception device site line of sight viewing angle. These precise procedures provide a highly competent means of spacecraft position targeting and eliminate the tedious time consuming trial and error methods of the past. The antenna reception device can now be erected and the tuning meter enclosed within the receiver used to peak the signal for maximum reception.

Accordingly, it is an objective of the instant invention to teach a method of establishing the suitability of an antenna reception device location.

It is a further objective of the instant invention to provide a lightweight, inexpensive, mechanical device to execute the method and target a satellite spacecraft position.

It is a further objective of the instant invention to provide an instrument that permits visual inspection of the line of sight between the instrument and a targeted satellite spacecraft.

It is also an objective of the instant invention to provide an instrument that permits observations of celestial positions based on True North by conversion of positions based on magnetic compass determination of magnetic North.

It is yet another objective of the instant invention to provide an instrument to determine azimuth, and inclination to a celestial satellite spacecraft position in space from any geographical location.

Other objectives and advantages of this invention will become apparent from the following description taken in conjunction with the accompanying drawings wherein are set forth, by way of illustration and example, certain embodiments of this invention. The drawings constitute a part of this specification and include exemplary embodiments of the present invention and illustrate various objects and features thereof.

BRIEF DESCRIPTION OF THE FIGURES

FIG. 3 is a plan view of the azimuth pointer;

FIG. 4 is a side view of the declination slider assembly;

FIG. 5 is a plan view of the slider of the declination slider assembly of FIG. 4;

FIG. 6 is a plan view of the viewing lens;

FIG. 9 is a declination table.

DETAILED DESCRIPTION OF THE INVENTION

Figure 1:
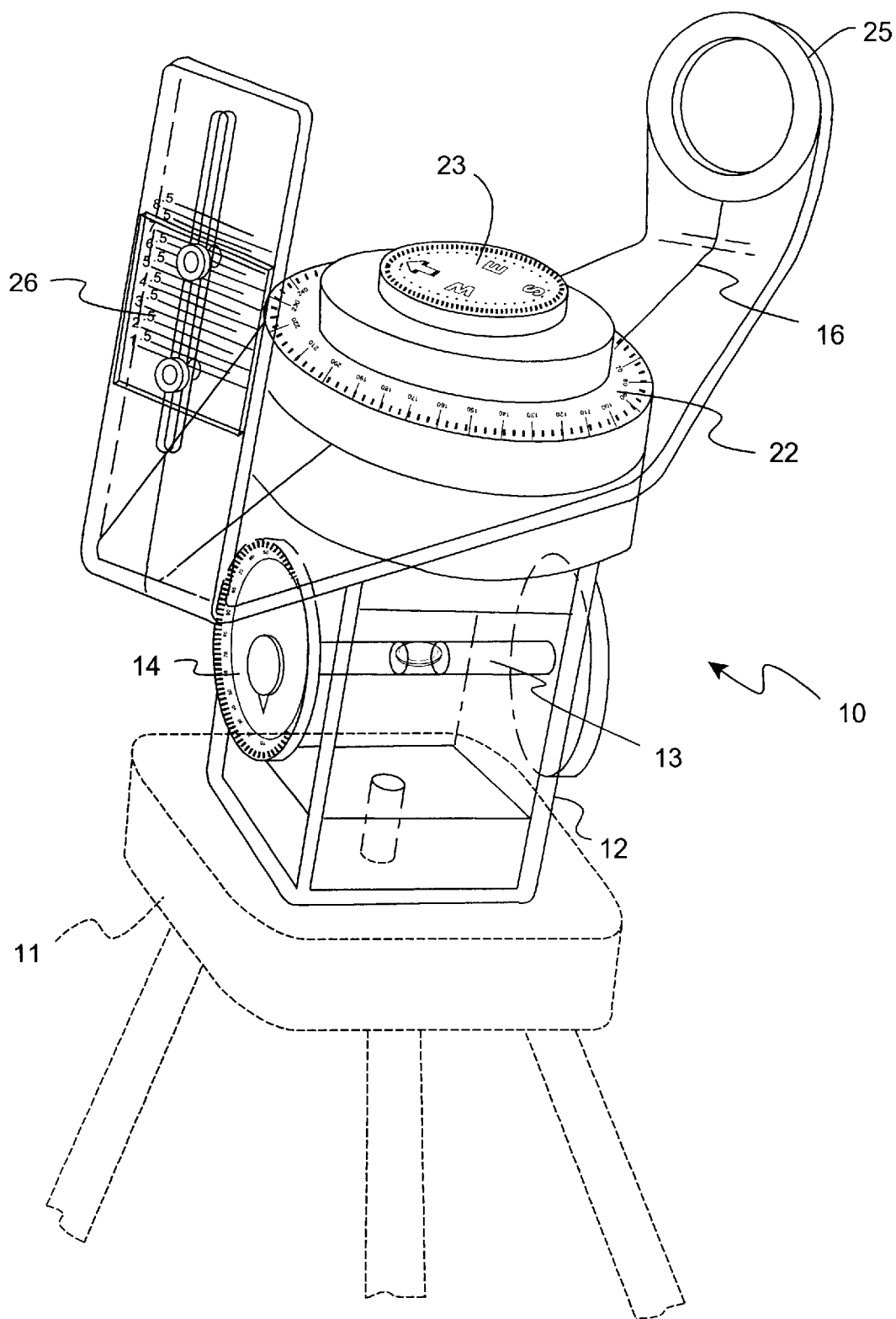
FIG. 1 is a elevation view of the instrument of this invention.

The satellite spacecraft targeting device 10 is shown in FIG. 1. As shown, the device is made of transparent plastic material, for example, acrylic or the like. The targeting device is light weight and is of such a size as to be hand held. The device may be mounted,on an adjustable tripod 11, such as used with a camera. Such tripods are usually very light and have adjustable length legs allowing the base to be leveled over uneven terrain. The base of the tripod has a mounting screw which is threaded into the base of the satellite spacecraft targeting device. Any support base may be used that can be leveled and plumbed while holding the satellite spacecraft targeting device secure.

The satellite spacecraft targeting device 10 has a base or quadrilateral tower 12. Mounted inside the tower is a bubble level 13 which is oriented to indicate level with the bottom or lower surface of the tower. The ends of the bubble vial are connected to the interior surface s of opposite side walls of the tower.

Figure 8:
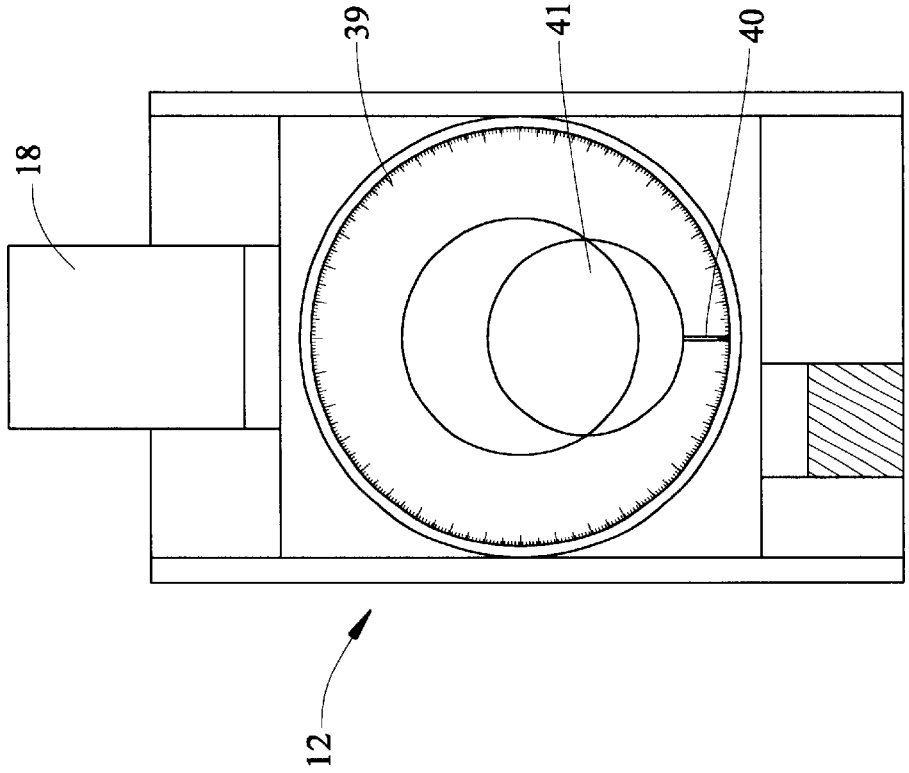
FIG. 8 is a plan view of another side of the tower assembly showing the angle finder.

The angle finder assembly 14, shown in more detail in FIG. 8, is mounted on an exterior surface of a side wall of the tower. The angle finder is oriented perpendicular to the bubble level vial, i.e. the angle finder is on the exterior surface of the same side wall that holds one end of the bubble level vial. There may be an angle finder on the exterior surface of the opposite side wall to provide viewing from either side of the instrument.

The top or upper wall of the tower 12 is parallel with the lower surface. Mounted on and parallel to the top surface of the tower is a disk 15 which carries the azimuth pointer 16. There is a Teflon washer 17 located between the disk 15 and the azimuth pointer 16 to provide a bearing surface for the pointer. The azimuth pointer 16, shown in detail in FIG. 3, is movable through a 360 degree arc with the plane of the arc parallel with the axis of the bubble level.

Figure 2:
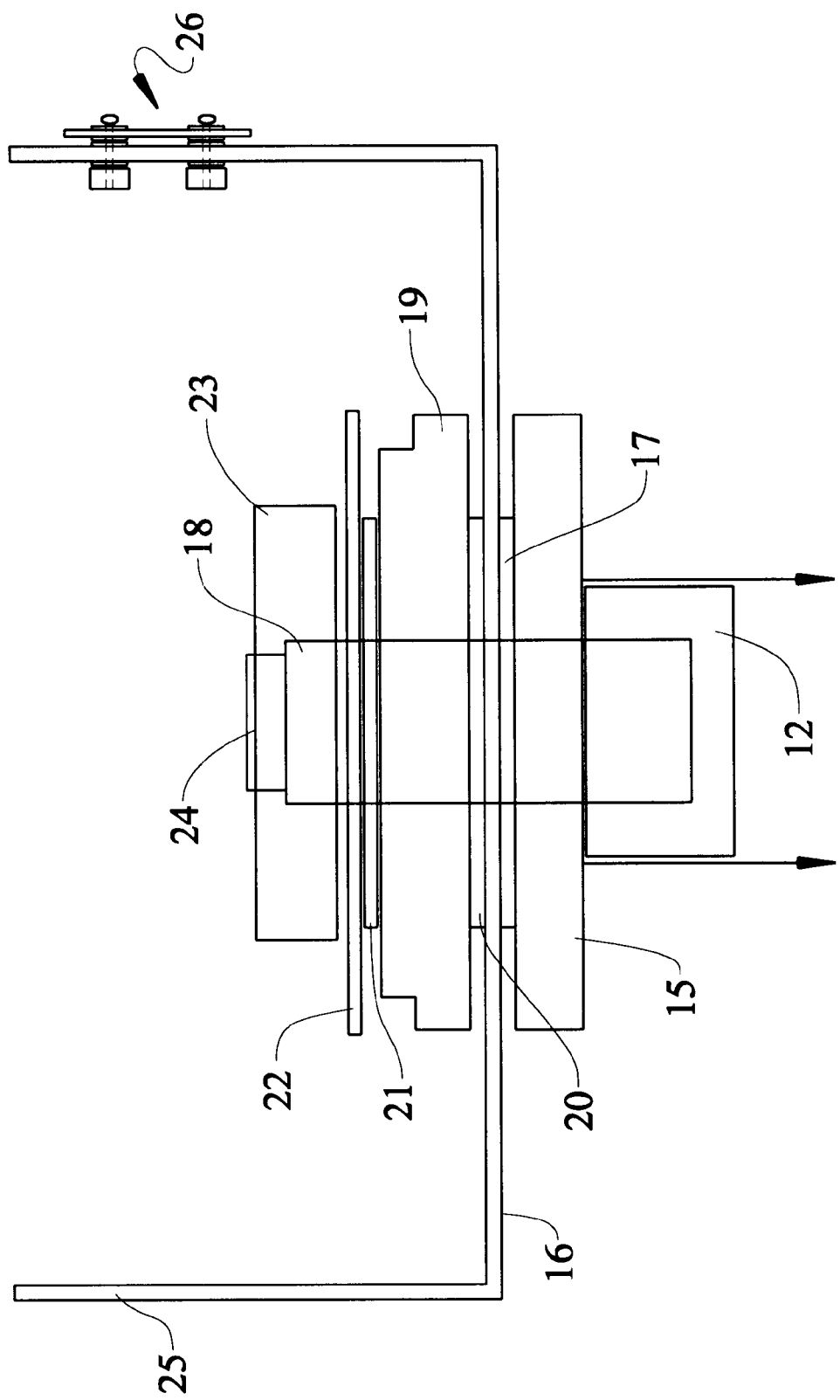
FIG. 2 is a cross section of the instrument of FIG. 1.

Also mounted on the top wall of the tower is a cylindrical spindle 18 the axis of which is perpendicular to the top wall of the tower 12. The disk 15, Teflon washer 17 and azimuth pointer 16 are all connected to the spindle 18, as shown in FIG. 2.

A disk 19 is fixedly attached to the spindle 18 above the azimuth pointer 16. Between the disk 19 and the azimuth pointer is a Teflon washer 20 providing a bearing surface for the pointer.

The azimuth dial 22 is movably mounted on the spindle 18 between two Teflon washers 21 and is rotatable through a 360 degree arc. The dial is calibrated about its circumference with markings for 360 degrees.

A retaining collar 23 is fixed on the upper end of the spindle 18. A wet compass 24 is mounted on the retaining collar. The compass card rotates in a plane parallel to the plane of the azimuth dial 22, and the azimuth pointer 16.

As shown in FIG. 3, the azimuth pointer 16 has a reference line 27 extending from one end to the other. When viewed from the top of the instrument, the reference line 27 may be aligned with the calibrations on the azimuth dial 22 and the compass reading. At one end of the pointer there is a viewing lens 25 vertically oriented to the reference line, as shown in FIGS. 1 and 2. The other end of the pointer carries the declination slider assembly 26 oriented parallel to the viewing lens, also shown in FIGS. 1 and 2.

The declination slider assembly 26 has an angular scale 28 calibrated in 0.5 degree increments. The scale has a central slot 30 bisecting the markings and aligned with the reference line 27. FIG. 4 shows the slider 31 which is movably mounted in the slot 30. The slider is connected to set screws 32 and 33. The loosened screws may move throughout the length of the slot 30 and may temporarily fix the slider in place by tightening the screws. While screws are shown and described, other fastening devices providing releasable fixation may be used in the slider assembly, such as studs having rotatable oblong shafts for frictional engagement of the walls of the slot or slidable clips slidably movable to engage and release the lateral edges of the slider assembly. FIG. 5 shows the face 34 of the transparent slider as it appears when viewed against the viewing lens 25. The center point 35 is positioned on any of the interrupted markings of the scale 28 and temporarily locked in place by the set screws 32 and 33.

The viewing lens 25, in FIG. 6, is shown with cross hairs 36 in place. The intersection of the cross hairs designates the center of the viewing lens. To properly align the declination slider with the viewing lens 31, this intersection must be placed in line with the center of the viewing lens cross hairs. The lens has markings 37 on the circumference to locate the attachment of the respective ends of the cross hairs.

Figure 7:
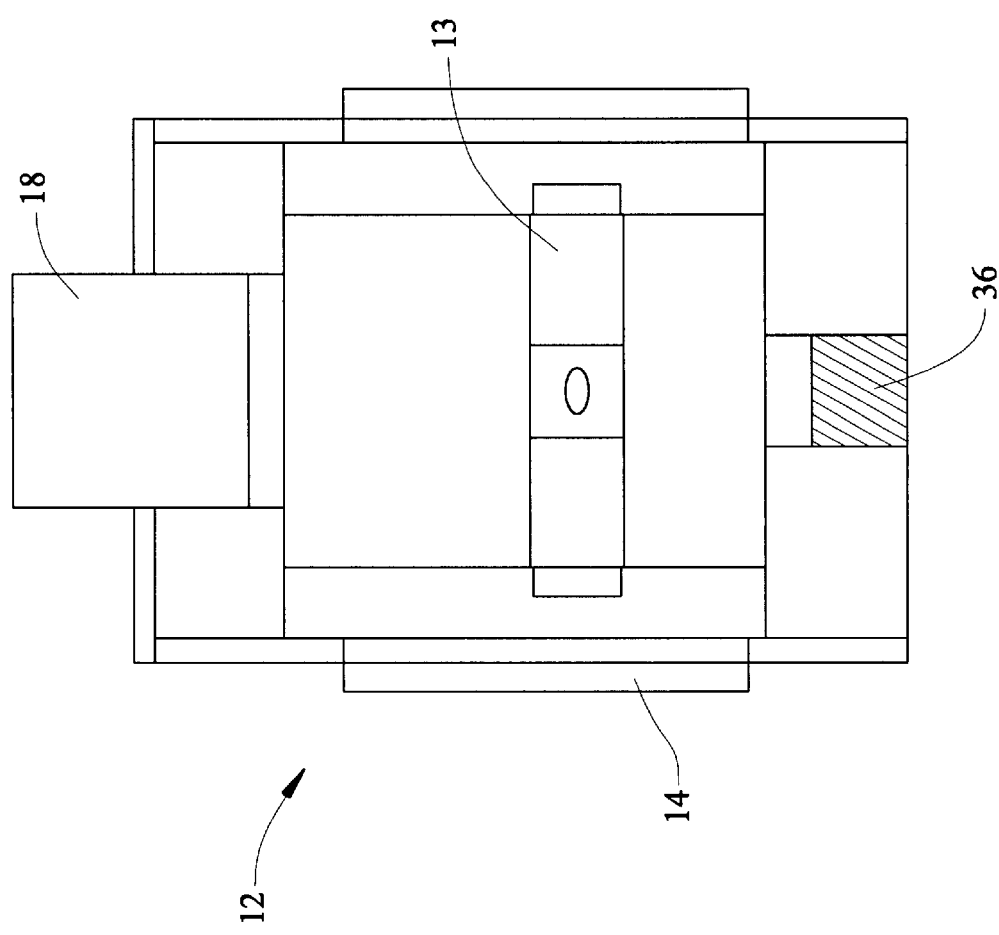
FIG. 7 is a plan view of the tower assembly.

The tower 12, shown in FIGS. 7 and 8, has an attachment aperture 38 for mounting on a support base. The bubble level 13 is located centrally of the tower body. The angle finder 14 is located in a compartment on the outside wall of the tower. The angle finder scale 39 is oriented perpendicular to the bubble level. The scale is oriented so that it reads 0 when the instrument is plumb. The arcuate scale 39 is calibrated in 360 degrees of arc however, the markings are given in 90 degree quadrants. The scale is oriented such that the angle finder reads degrees of inclination of the entire device, as an inclinometer. The needle pointer 40 is attached to the center of the arcuate scale and can rotate through 360 degrees. The needle has a weight 41 located between the attached end and the free end which results in the needle acting as a plumb-bob.

Certain information is required before the operation of the satellite spacecraft targeting device. Part of this information may be obtained by use of accurate charts or maps to determine the (1) magnetic variation from True North and (2) the latitude of the location of the proposed TV antenna reception device site. In some locations, the local airport or Coast Guard station or GPS (Global Positioning System)will provide this information. Also, each TV receiver is provided with an (3) azimuth table based on Postal Zip Codes. Refer to this table to obtain the azimuth from the proposed site.

In operation, the suitability of a proposed TV antenna reception device site may be determined by the satellite spacecraft targeting device 10 using the following procedure.

In operation, the device is operated according to the following steps:

1 Mount the device on a tripod by using the attachment point provided on the device.

2 When mounted, the device's viewing lens should be in front of the compass card as it is viewing south at 180 degrees. If you are located south of the equator, the device's viewing lens should be in front of the compass card as it is viewing north at zero degrees. The declination slider will always be on the opposite end of the azimuth pointer.

3 All viewing will take place from the declination slider's position and all field of view changes will take place within the viewing lens window.

4 Leveling of the device with the angle finders first being zeroed out followed by the centering of the bubble vial and then a recheck to confirm that the compass is still positioned at those points on the compass car in #2. If not realign compass to correct.

5 Align azimuth dial so that it reads same degrees as compass.

6 Align azimuth pointer so that it reads alignment with compass and azimuth dial.

7 The variation in degrees between magnetic compass reading and true heading is now accomplished by adjusting azimuth dial to read # of degrees of variation in opposite direction of compass reading example 5 degrees west variation moves the azimuth dial away from the compass reading of 180 degrees in the easterly direction. This establishes a new position for beginning the azimuth reading at 180 degrees.

8 Align azimuth pointer center mark with this new 180 degree mark position on the azimuth dial.

9 From this position move the azimuth pointer to the azimuth degrees position for the satellite spacecraft position to be viewed. Note this position is found in most satellite receivers by inputting the zip code. If not these locations can be found on the INTERNET or in charts provided by satellite spacecraft manufacturers.

10 Adjust declination slider degrees to match latitude of intended antenna reception device location from chart provided.

11 Tilt device back until angle finder reads the compliment of the latitude of the location. Example, subtract the latitude of the area plus 0.5 degrees from 90 degrees and read that angle on angle finder.

12 Position eye so that dot on declination slider alignment bar aligns in cross hairs of viewing lens. This is spacecraft's true position. Any obstructions viewed in viewing lens impairs signal reception.

The satellite spacecraft targeting device 10 is mounted and secured on a support base, preferably a tripod. The support base or tripod is manipulated so as to bring the bubble level 13 to level and the angle finder 14 to 0. When the device is stabilized, the compass card will have a steady indication of magnetic North. The base or tripod is manipulated again to orient the angle finder to face East or West. Turn the azimuth dial 22 to place 0 under magnetic North compass reading and the 180 mark under the South compass reading.

In the northern hemisphere, align the viewing lens 25 on the South side of the compass and the declination slider assembly 26 on the North side of the compass. For the southern hemisphere, the alignment would be the opposite.

Rotate the azimuth pointer 16 until the reference line is under the 0 and 180 marks of the azimuth dial. The device is now oriented such that a view through the declination slider toward the viewing lens is aligned with magnetic South. Using the latitude gathered from a map or other reliable source, refer to a declination chart, as shown in FIG. 9, and determine the number of degrees of declination for the latitude of the antenna reception device site. If the latitude obtained falls between latitudes given in the chart, the correct degrees for the slider setting may be interpolated. Move the slider to place the center point 35 on the specified degree line on scale 28. This will compensate the device for the particular geographic latitude of the antenna reception device site.

To compensate the device for viewing True North, necessary for celestial navigation used for satellite spacecrafts, rotate the azimuth dial to add or subtract the number of degrees of variation obtained from a chart or other source. If the variation is given as West, add the degrees and if given as East, subtract the number of degrees. For example, if the variation is given as West 10 degrees, move the azimuth dial the opposite direction or East. As noted above, the azimuth dial was set with the 0 aligned with magnetic North on the compass, the azimuth pointer reference line was also aligned with 0 and magnetic North and the view through the device was magnetic South. If the azimuth dial is moved to add 10 degrees variation, the reference line will now align with 10 and 190 on the azimuth dial. Once the variation has been added or subtracted, move the azimuth pointer to again align the reference line with 0 and 180 on the azimuth dial. The view through the device is now True South.

Using the azimuth information provided with the TV satellite receiver, move the azimuth pointer to place the reference line 27 on the given number on the azimuth dial. This line represents the lateral position of the communications satellite relative to the proposed antenna reception device site.

The same latitude already obtained is now applied to the compensated angle finder 14. To align with the center of the satellite spacecraft beam, add 0.5 degree to the latitude given for the antenna reception device site. Subtract this number from 90 and incline the device on the tripod so that the angle finder needle falls on the appropriate number which is the declination angle for the satellite spacecraft. The celestial position of the satellite spacecraft is now targeted.

Look through the declination slider toward the viewing lens, lining up the cross hairs 36 with the center point 35. This is the line of sight to the communications satellite from the device. If there is any obstruction in this line of sight observable through the viewing lens, the proposed antenna reception device site may be unsuitable. If the site is determined to be suitable, the position for the antenna reception device mast is directly below the center of the tower 12.

It is to be understood that while a certain form of the invention is illustrated, it is not to be limited to the specific form or arrangement of parts herein described and shown. It will be apparent to those skilled in the art that various changes may be made without departing from the scope of the invention and the invention is not to be considered limited to what is shown and described in the specification and drawings.

I claim:

1. A method of determining the suitability of a satellite communications antenna reception device site comprising the steps of:
   a) providing a satellite spacecraft targeting device including a compass, an azimuth indicator, a bubble level, a declination slider with a scale marked in degrees and a movable alignment bar, a viewing lens and an inclinometer,
   b) leveling said device and plumbing said inclinometer,
   c) horizontally aligning the device with magnetic North as indicated by said compass,
   d) compensating the device to align with True North,
   e) compensating the device for the celestial latitude of the location of the device,
   f) aligning the azimuth indicator with the celestial azimuth of the communications satellite,
   g) determining the declination angle of the satellite spacecraft,
   h) aligning said alignment bar with said declination angle on said declination slider;
   i) inclining said device as measured by said inclinometer to target said satellite spacecraft by viewing through said declination slider and said viewing lens with said alignment bar in the center of said viewing lens, and
   j) observing the line of sight between said device and said satellite spacecraft to determine presence of any obstructions.

2. A method of determining the suitability of a satellite communications antenna reception device site as in claim 1 comprising the steps of
   a) initially manipulating said device to orient said inclinometer to operate in a plane parallel to said azimuth indicator.

3. A method of determining the suitability of a communications satellite antenna reception device site as in claim 1 comprising the steps of:
   a) determining the declination angle by referring to said celestial latitude of said device;
   b) subtracting said latitude plus 0.5 degree from 90 degrees for inclination angle; and
   c) inclining said device to read said inclination angle on said inclinometer.

4. In a device for determining the suitability of a communications satellite antenna reception device site having means for orienting said device in a level attitude with respect to the horizon, magnetic compass means for orienting the device relative to magnetic North, azimuth indicating means for determining and referencing any angular displacement relative to magnetic North, means for celestially compensating said device relative to a geographic location, and viewing means for observing a line of sight relative to said declination angle, said viewing means further comprises a viewing assembly, said viewing assembly having a viewing lens spaced from a declination slider, said declination slider having a movable alignment bar, said declination slider having a scale marked in degrees, said movable alignment bar selectively positioned on said declination slider scale whereby aligning said movable alignment bar with the center of said viewing lens results in a line of sight from said site to a satellite, the improvement comprising means for orienting said device relative to the declination angle of a satellite spacecraft including an inclinometer.

* * * * *